(12) United States Patent
Virdis

(10) Patent No.: US 10,730,411 B2
(45) Date of Patent: Aug. 4, 2020

(54) MOTOR VEHICLE SEAT

(71) Applicant: C.R.F. SOCIETA' CONSORTILE PER AZIONI, Orbassano (IT)

(72) Inventor: Tiziana Virdis, Orbassano (IT)

(73) Assignee: C.R.F. SOCIETA' CONSORTILE PER AZIONI, Orbassano (TO) (IT)

( * ) Notice: Subject to any disclaimer, the term of this patent is extended or adjusted under 35 U.S.C. 154(b) by 35 days.

(21) Appl. No.: 16/227,164

(22) Filed: Dec. 20, 2018

(65) Prior Publication Data

US 2019/0184861 A1   Jun. 20, 2019

(30) Foreign Application Priority Data

Dec. 20, 2017 (EP) ..................... 17425127

(51) Int. Cl.
| | |
|---|---|
| *B60N 2/26* | (2006.01) |
| *B60N 2/32* | (2006.01) |
| *B60N 2/28* | (2006.01) |
| *B60N 2/30* | (2006.01) |
| *B60N 2/42* | (2006.01) |

(52) U.S. Cl.
CPC ............. *B60N 2/26* (2013.01); *B60N 2/265* (2013.01); *B60N 2/2887* (2013.01); *B60N 2/3086* (2013.01); *B60N 2/32* (2013.01); *B60N 2/4235* (2013.01)

(58) Field of Classification Search
CPC .......... B60N 2/26; B60N 2/265; B60N 2/288; B60N 2/2887; B60N 2/3086; B60N 2/32; B60N 2/4235
USPC ................................................ 297/236, 237
See application file for complete search history.

(56) References Cited

U.S. PATENT DOCUMENTS

| | | | |
|---|---|---|---|
| 5,265,934 A * | 11/1993 | Forget .................... | B60N 2/309 297/237 |
| 5,553,918 A | 9/1996 | Baret et al. | |
| 5,660,437 A * | 8/1997 | Bauer .................. | B60N 2/3065 297/237 |

(Continued)

FOREIGN PATENT DOCUMENTS

| | | |
|---|---|---|
| DE | 4333108 C1 | 8/1994 |
| EP | 1721777 A2 | 11/2006 |

(Continued)

OTHER PUBLICATIONS

European Search Report Application No. 17425127 dated Jun. 7, 2018.

*Primary Examiner* — Anthony D Barfield
(74) *Attorney, Agent, or Firm* — Harness, Dickey & Pierce, P.L.C.

(57) ABSTRACT

A motor vehicle seat is provided with a backrest and a seat portion having a fixed element and at least one body which can be moved between a lowered configuration, in which it forms with the backrest a place for an adult passenger, and a raised configuration, in which it forms a booster seat suitable for supporting a child; the body is releasably fixed in the raised configuration by means of a fastening device and carries a side support element, which is arranged next to the body and is movable between an operating configuration, in which it protrudes upwards with respect to an upper surface of the body, and a rest configuration, in which it is arranged lower or flush with respect to said upper surface.

13 Claims, 5 Drawing Sheets

(56) References Cited

U.S. PATENT DOCUMENTS

| | | | | |
|---|---|---|---|---|
| 5,788,326 A * | 8/1998 | Kawade | ............... | B60N 2/2812 |
| | | | | 297/236 |
| 7,815,256 B2 * | 10/2010 | Erlingstam | .......... | B60N 2/3084 |
| | | | | 297/237 |
| 8,182,034 B2 * | 5/2012 | Glance | ................. | B60N 2/2866 |
| | | | | 297/253 |

FOREIGN PATENT DOCUMENTS

| | | |
|---|---|---|
| FR | 2897020 A1 | 8/2007 |
| JP | S6370437 U | 5/1988 |

\* cited by examiner

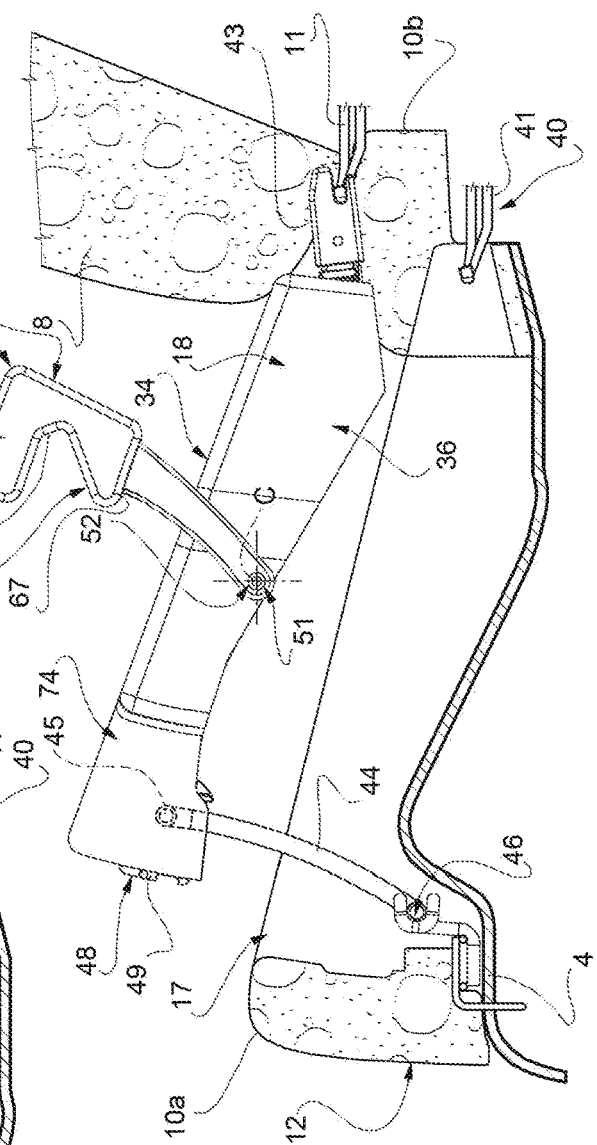
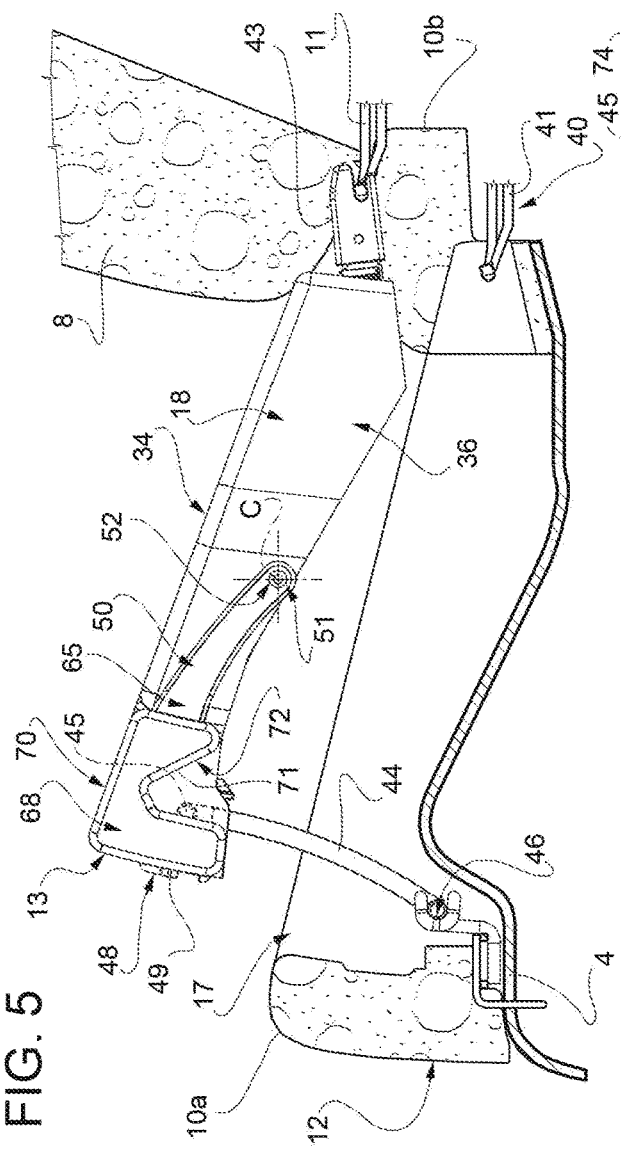

MOTOR VEHICLE SEAT

CROSS-REFERENCE TO RELATED APPLICATIONS

This application claims priority from European Patent Application No. 17425127.2 filed on Dec. 20, 2017, the disclosure of which is incorporated by reference.

TECHNICAL FIELD

The present invention relates to a motor vehicle seat.

BACKGROUND OF THE INVENTION

As already known, children in a motor vehicle must sit in booster seats suitable for ensuring their safety. These booster seats are arranged on the rear seat and securely fastened to the vehicle body by means of releasable coupling systems.

Usually, these coupling systems are of the so-called ISOFIX type. Being standardized, these systems allow fastening various types of booster seats, having different manufacturers and shapes, also based on the age of the children on board.

When removed from its position of use, the booster seat is normally moved out of the vehicle passenger compartment and stored in the boot or somewhere out of the vehicle.

However, the size and weight of child seats discourages their frequent handling, and therefore, although easily releasable, they are often left in their position of use even when no children are on board.

It follows that the presence of the booster seat on the rear seat causes the adult passengers various inconveniences due to a reduction in the useful space in the rear passenger compartment of the motor vehicle.

For this reason, available configurable seat solutions comprise a seat portion having a fixed part and at least a removable or more generally movable part. The movable part can be fastened, e.g. by means of ISOFIX anchoring elements, according to two distinct configurations, one of which is raised if compared to the other.

In the raised configuration, the movable part of the seat portion is arranged at a height suitable for forming a booster seat for children with the back of the seat.

On the other hand, when said movable part is in the other configuration, an adult passenger can sit on it without having the visual or tactile perception of sitting on a removable component, or in any case, a component separated from the remaining parts of the seat.

Solutions of the aforesaid type can be approved in classes Q6 and Q10 according to the European regulation ECE129/2012 and subsequent amendments, i.e. in groups 2 and 3 according to the European regulation ECE44/2005 and subsequent amendments.

EP1721777 A2 describes a configurable seat of the previously described type. More in detail, the document EP1721777 A2 describes a seat having a seat portion consisting of two side cushions and of a removable central portion, so that it can be arranged over one of said side cushions to be used as a booster seat for children.

Although the known solutions of the aforesaid type are versatile, reduced in size and aesthetically appreciable, there is a need to improve them to increase the child safety level.

In particular, according to these known solutions, the side restraint function of the child in the event of collisions is only performed by the vehicle safety belts.

The Applicant has experimentally verified that when a side impact occurs on a vehicle side, safety belts only marginally contribute to stop a side displacement of the child. In fact, due to the forces of inertia arising from the impact, the child tends to move towards the point where the impact occurred. When the impact occurs on the side furthest from the child seat, the child moves in particular towards the centre of the seat, in spite of the safety belts being correctly fastened around the child and the seat.

SUMMARY OF THE INVENTION

The object of the present invention is therefore manufacturing a motor vehicle seat, which simply and inexpensively fulfils the aforesaid need.

According to the present invention, a motor vehicle seat is manufactured as defined in claim 1.

BRIEF DESCRIPTION OF THE DRAWINGS

The invention will now be described with reference to the attached drawings showing a non-limiting example, in which:

FIGS. 5 and 6 are similar to FIG. 2 and show the seat in an intermediate phase between the first and the second configuration and, respectively, in the second configuration.

DETAILED DESCRIPTION OF THE INVENTION

Figure 1:
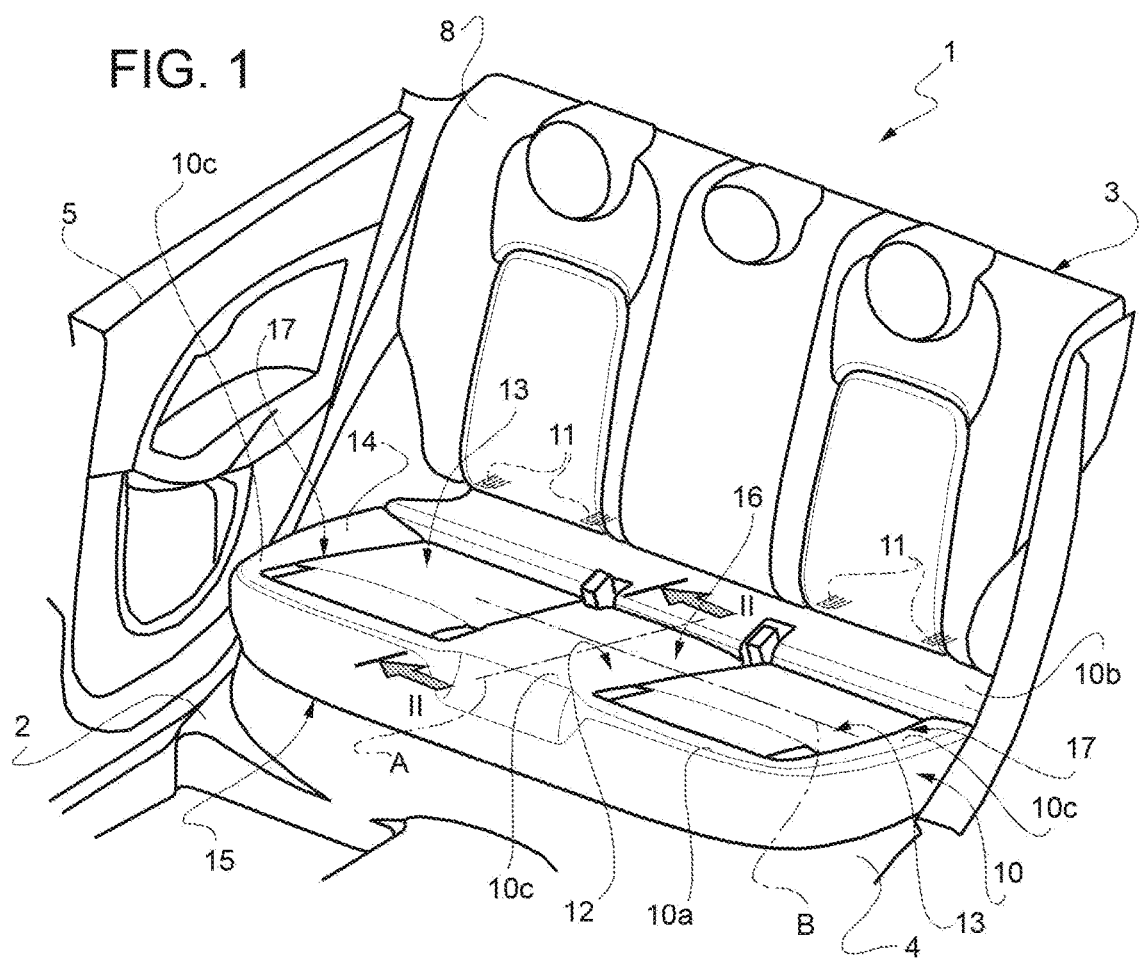
FIG. 1 is a partial perspective view of a motor vehicle provided with a preferred embodiment of the seat according to the present invention and shown in a first configuration.
Figure 2:
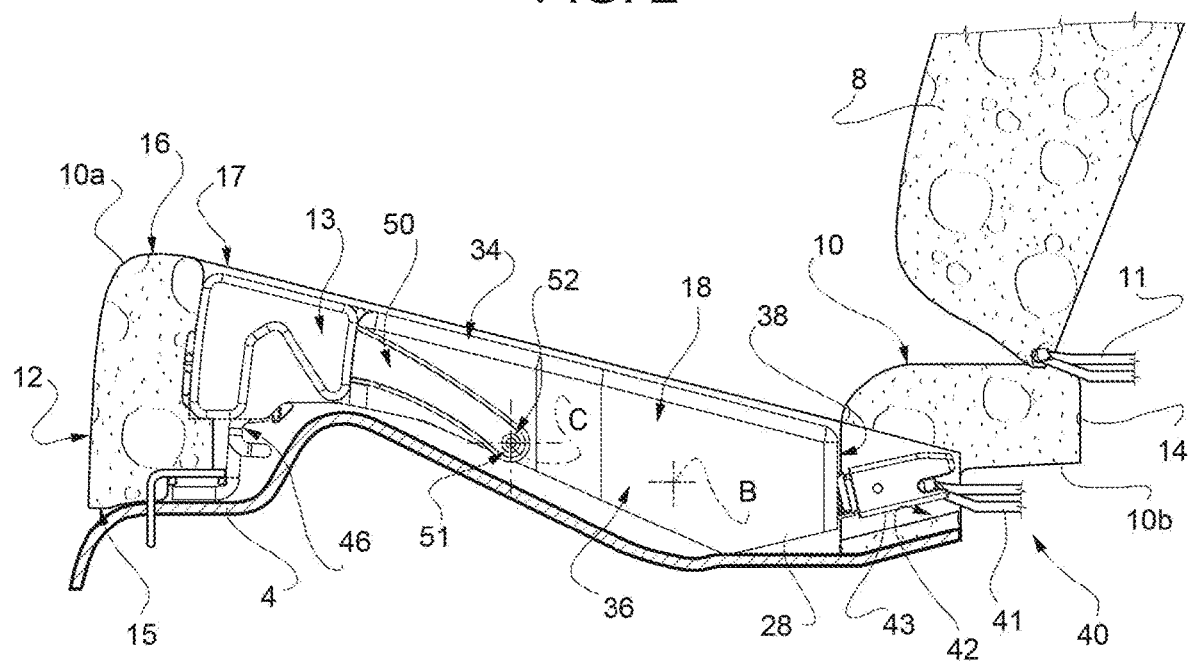
FIG. 2 is a section of the seat according to a vertical section plane identified by the line II-II in FIG. 1.

In FIGS. 1 and 2, the reference number 1 indicates, as a whole, a motor vehicle, of which only some parts are shown. The motor vehicle 1 comprises a body 2 forming the support structure of the motor vehicle, and a rear seat 3 arranged on a support wall 4 fastened in a known and not shown manner to the body 2, or being part of the body 2.

The motor vehicle 1 also comprises two sides (only one of which is shown in FIG. 1 and is indicated by the reference number 5) provided with doors, which allow a passenger to enter the passenger compartment of the motor vehicle 1 and sit on the seat 3.

As shown in FIG. 1, the seat 3 defines three side-by-side places where respective adult passengers can sit. In particular, two of them are side places, i.e. they are adjacent to the vehicle sides and are symmetrical with respect to the third central place. This latter place is arranged along a longitudinal axis A of advancement of the motor vehicle 1.

Here and in the following, terms such as "front", "rear", "before", "behind", "side", "advanced", etc. . . . are meant with reference to the direction of travel along the axis A. The seat 3 horizontally extends along an axis B, orthogonal to the longitudinal axis A and comprises a backrest 8, which is coupled to the body 2, preferably in a reclining way.

Furthermore, the seat 3 comprises a seat portion 10, which ends at the front with an end portion 10*a* and at the back with an end portion 10*b*, arranged below the backrest 8.

Again, as shown in FIGS. 1 and 2, at each of the aforesaid side places, the seat 3 comprises a relative pair of anchoring elements 11 vertically arranged between the rear portion 10*b* and the backrest 8.

Each pair of anchoring elements 11 is fixed with respect to the body 2 and its shape and characteristics allow fastening a booster seat for children (not shown) available on the market resting on the seat portion 10. The anchoring elements 11 are manufactured according to the so-called ISO-FIX standard, regulated according to the ECER14/2004 regulation and subsequent amendments.

Referring again to FIGS. 1 and 2, the seat portion 10 comprises a fixed element 12 and two movable elements 13.

The fixed element 12 comprises a cushion 16 and has a lower surface 15 contacting the support wall 4 and an upper surface 16 for supporting, together with the movable elements 13, the passengers inside the passenger compartment, as will be better described in the following. The fixed element 12 comprises the portions 10*a*, 10*b* and defines a pair of equal seats 17 arranged at the side places.

Preferably, the seats 17 extend vertically over the whole height of the seat portion 10 and are therefore defined at the bottom by the wall 4.

Moreover, the seats 17 are defined at the front by the portion 10*a*, at the back by the portion 10*b*, and on the side by two portions 10*c* of the element 12. In other words, the seats 17 have a closed contour, so that they are only open at the top. Alternatively, the seats 17 have an open contour, e.g. C-shaped (defined by the portions 10*c* and 10*b*). In other words, the seats 17 are open not only at the top but also at the front and/or on the side.

The seats 17 have such a shape and size to house, respectively, the movable elements 13, which are symmetrical with respect to a vertical plane on which the axis A lies. Therefore, the following description will refer only to one of the movable elements 13 for simplicity's sake.

Figure 4:
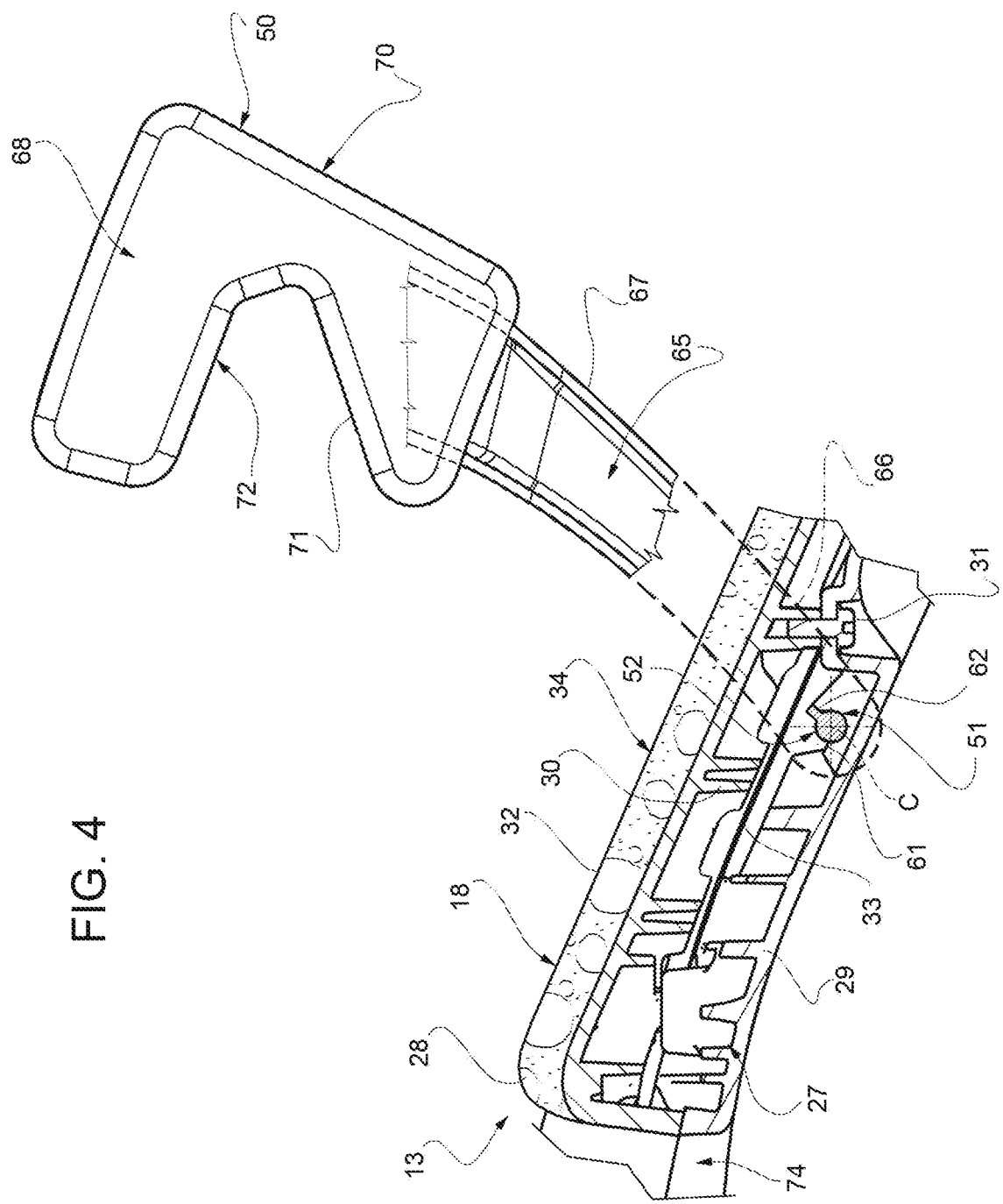
FIG. 4 is a side view, with parts removed for clarity's sake and on an enlarged scale, of a detail of the seat of FIG. 3.

As shown in FIG. 4, the movable element 13 comprises a body 18, which in turn comprises a frame 27 and a cushion 28, which is supported by the frame 27 and, preferably, completely covers it.

Preferably, the frame 27 comprises a lower half-shell 29 and an upper half-shell 30, coupled to each other in a fixed position, preferably by means of threaded elements 31.

The body 18 further comprises a coating 32, which covers the cushion 28 and is fastened to the frame 27, e.g. by means of its own perimeter strip 33, which is arranged between the two half-shells 29, 30.

Figure 3:
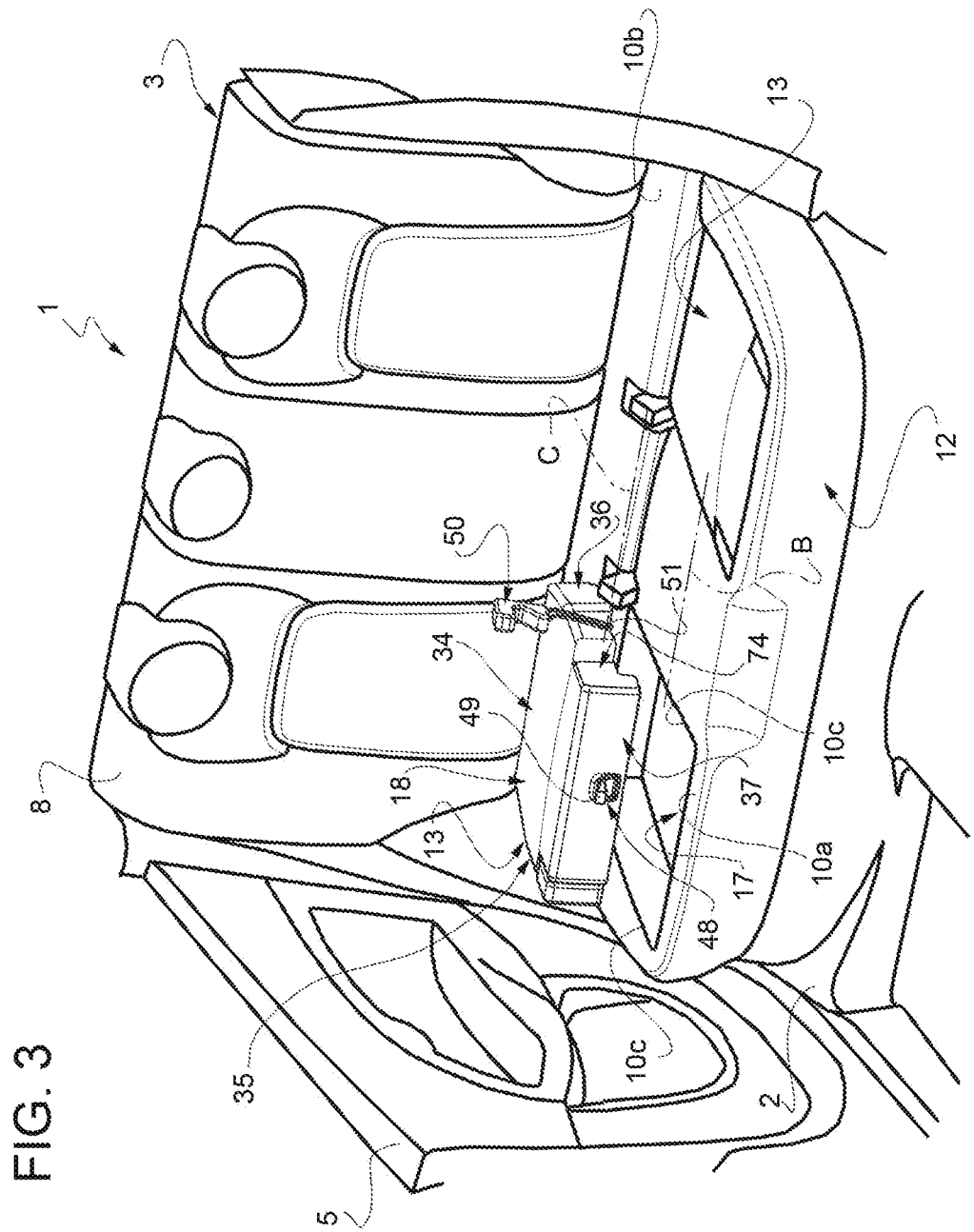
FIG. 3 is similar to FIG. 1 and shows the seat in a second configuration.

Referring now to FIGS. 2 and 3, the body 18 has an upper surface 34, whose width is such that a child can sit on it, and a pair of side surfaces 35, 36 opposite to each other with respect to the axis B. In particular, the side surface 35 is closer to the side 5 if compared to the side surface 36. The body 18 further has a front surface 37 and a rear surface 38.

The body 18 is movable between a lowered configuration (FIGS. 1 and 2), in which it engages the corresponding cavity 17 and in which the surface 36 is arranged flush with the surface 16, so as to form the side place, together with a part of the backrest 8; and a raised configuration (FIGS. 3, 5 and 6), in which the body 18 is arranged higher than the lowered configuration and forms a child seat, in particular according to classes Q6 and Q10 of the European regulation ECE129/2012 and subsequent amendments, i.e. according to groups 2 and 3 of the European regulation ECE44/2005 and subsequent amendments.

Referring now again to FIG. 2, the seat 3 further comprises a fastening device 40 for securing each body 18 in the lowered and raised configurations.

In particular, the fastening device 40 comprises the anchoring elements 11 and the anchoring elements 41, which are arranged below the anchoring elements 11, each preferably in a cavity 42 of the portion 10*b*, open towards the cavity 17. Advantageously, the anchoring elements 41 are equal to the anchoring elements 11 and, like these latter, the anchoring elements 41 are fixed with respect to the body 2.

The fastening device 40 further comprises a pair of attachment elements 43, carried by the body 18 and configured to be releasably and selectively coupled to the anchoring elements 11 and to the anchoring elements 41.

As shown in FIG. 2, the attachment elements 43 are preferably fastened to the frame 27 so as to protrude from the rear surface 38.

According to an alternative not shown, the anchoring elements 41 are arranged in the cavity 17, and therefore in a more advanced position with respect to the one shown in FIGS. 2, 5 and 6, whereas the attachment elements 43 are coupled to the frame 27 so as to be moved between a first position, in which they are housed in the frame 27 to be coupled with the anchoring elements 41, and a second position, in which they protrude from the rear surface 38 to be coupled with the anchoring elements 11.

As shown in FIG. 2, when the attachment elements 43 are hooked to the anchoring elements 41, the body 18 is fastened in the lowered configuration. On the other hand, as shown in FIGS. 5 and 6, when the attachment elements 43 are hooked to the anchoring elements 11, the body 18 is fastened in the raised configuration.

Since the body 18, in the raised configuration, is arranged above the corresponding cavity 17, a support foot 44 is provided between the body 18 and the wall 4 to support the vertical loads relative to the weight of the body 18 and of a child sitting on the upper surface 34. Preferably, the support foot 44 has an end 45 hinged to a front area of the frame 27 to rotate between a folded position, in which it horizontally engages a casing (not shown) of the lower half-shell 29, and an extended position, in which it projects downwards from the body 18 to engage a retaining seat 46, fixed with respect to the wall 4.

In order to release the attachment elements 43 from the anchoring elements 11 and 41, the body 18 carries a transmission device 48, in particular of the traction type, which at one end is coupled to the attachment elements 43 and at the opposite end (indicated by the reference number 49) can be controlled by the passenger to release the attachment elements 43. The device 48 is defined, for example, by a tape or a Bowden cable. Advantageously, as shown in FIG. 3, the end 49 protrudes from the front surface 37 so as to be grasped by the passenger. Conveniently, the transmission device 48 internally crosses the frame 27 for aesthetic reasons and to protect the device 48.

To transfer the body 18 from the lowered configuration to the raised configuration, the attachment elements 43 are first released from the anchoring elements 41 by operating the device 48 and then the body 18 is removed from the cavity 17. The body 18 is now completely free from the fixed element 12. After lowering the support foot 44 and having arranged it in the retaining seat 46, the attachment elements 43 are hooked to the anchoring elements 11.

According to variants not shown, the fastening device 40 is different from the one indicated by way of example. In particular, the body 18 could be mounted on a mechanism, e.g. of the lever type, which allows both displacing and fastening the body 18 in the lowered and in the raised configuration; and/or the body 18 remains fastened in the cavity 17 due to friction or interference with the fixed element 12, without specific fastening elements.

According to an aspect of the present invention, the movable element 13 comprises a side support element 50, which is movable with respect to the body 18 between a rest configuration (FIG. 5) and an operating configuration (FIG. 6).

The element 50 is arranged by the passenger in the rest configuration when the body 18 is in the lowered configuration. In particular, the element 50 is arranged beside the side surface 36, lower or flush with respect to the upper surface 34. In this way, the element 50 does not occupy the passenger place and, therefore, is not an obstacle or an encumbrance.

On the other hand, the element 50 is arranged in the operating configuration when the body 18 is in the raised configuration. The element 50 is still arranged next to the side surface 36, but protrudes upwardly with respect to the upper surface 34. Therefore, the support element 50 offers the child seated on the body 18 a side abutment or shoulder, which prevents the child from falling sideways from the body 18, i.e. prevents the child from moving towards the centre of the passenger compartment.

Advantageously, the movable element 13 comprises a connecting device 51, which couples the support element 50 to the frame 27 and allows rotations between the rest and the operating configurations about an axis C, parallel to the axis B. In particular, the device 51 comprises a hinge arranged at a longitudinally intermediate area of the surface 36.

According to a variant not shown, the support element 50 might be removed from the side of the body 18 to be moved manually in a rest configuration different from the one shown by way of example.

Figure 7:
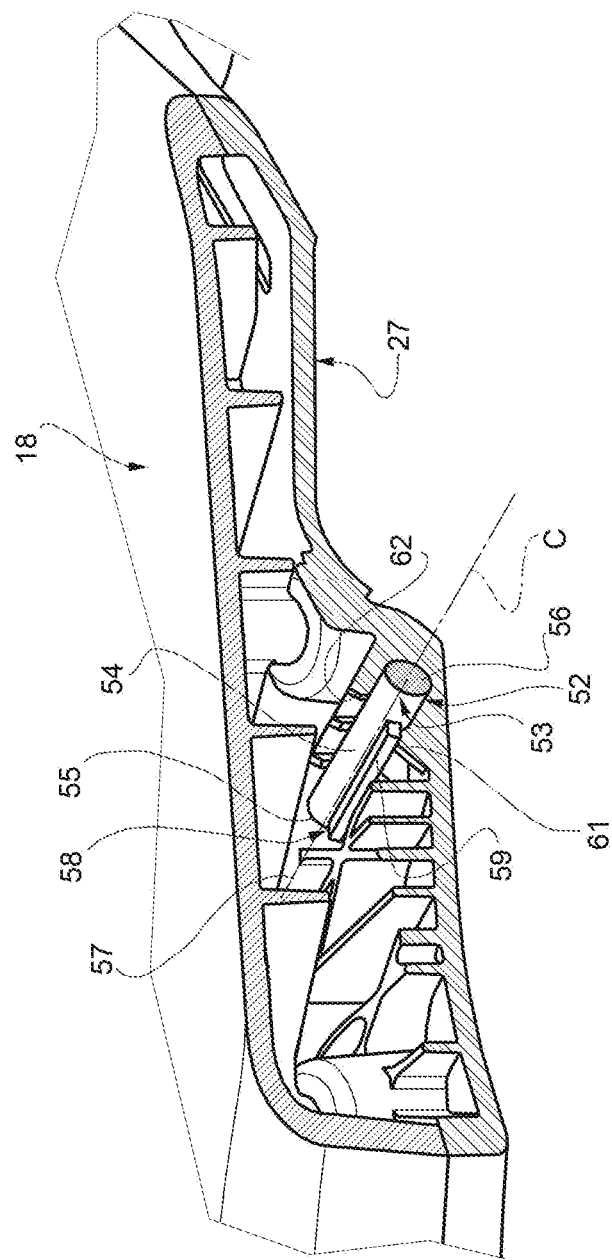
FIG. 7 shows the detail of FIG. 4 in perspective and with parts removed for clarity's sake.

Advantageously, as shown in FIG. 7, the hinge 52 comprises a pin 53, which extends inside the frame 27 along the axis C and is provided with an intermediate portion 54 and two axially opposite ends 55 and 56. The end 55 is inside the frame 27, whereas the end 56 is fastened to the support element 50, so that this latter can rotate together with the pin 53 about the axis C.

In particular, the frame 27 comprises two parallel perforated walls 57 (only one of which is shown in FIG. 7), orthogonal to the axis B and defining a hinge seat 58, which is rotatably engaged by the pin 53.

The hinge 52 further comprises a rib 59, which radially projects from the intermediate portion 54. At the same time, the lower half-shell 29 defines two shoulders 61, 62 angularly spaced with respect to each other about the axis C so as to define respective limits for the rotation of the rib 59 and, consequently, of the support element 50. In particular, the shoulder 61 is substantially horizontal and is arranged in front of the shoulder 62, which is in turn substantially vertical.

With particular reference to FIG. 4, according to a preferred aspect of the present invention, the support element 50 comprises an arm 65 having two opposite end portions 66, 67. The end portion 66 is supported by the device 51. The end portion 67, on the other hand, protrudes above the surface 34 when the support element 50 is in the operating configuration, and performs the side restraint function for the child when the body 18 is in the raised configuration. For this purpose, the material of the arm 65 is selected so as to have a relatively high flexural strength. For example, this material is metal, in particular steel.

Advantageously, the arm 65 is defined by a plate element, i.e. it has a relatively low thickness in a direction parallel to the axis C, to have the smallest possible encumbrance between the side of the body 18 and the fixed element 12 of the seat portion 10 in the lowered body configuration 18.

As shown in FIG. 5, the support element 50 has a radial length smaller than or equal to the distance between the axis C and the front surface 37. Thus, when the support element 50 is in the rest configuration, it does not protrude beyond the front surface 37.

Advantageously, the radial end of the portion 67 defines a core, which is covered by a coating element 68 made of a material less rigid than the one of the arm 65. For example, the coating element 68 is made of plastic material moulded over the arm 65. When the child rests on the support element 50, the coating element 68 prevents wounds and bruises due to the metal core 67.

In particular, when the support element 50 is in the rest configuration, the coating element 68 has a surface 70, which is arranged flush with the upper surface 34 for aesthetic reasons.

Conveniently, the coating element 68 comprises a gripping portion 71 having a concave surface 72, which facilitates the gripping and the subsequent rotation of the support element 50 into the operating configuration. In particular, the surface 72 is substantially U-shaped or V-shaped and defines a recess in which leaving to pass a seat safety belt (not shown), with guiding function of the same belt, when the support element 50 is in the operating configuration. Moreover, the surface 72 is opposite the surface 70, considering a tangential direction with respect to the axis B, i.e. it faces downwards when the support element 50 is in the rest configuration.

According to a further preferred aspect of the present invention, as shown in FIG. 3, the surface 36, i.e. the side of the body 18, has a recess 74, which houses the coating element 68 when the support element 50 is in the rest configuration. In particular, the recess 74 extends in height over the whole height of the body 18. Advantageously, the recess 74 is formed at the surface 37, i.e. at a front edge of the body 18. As an alternative to the recess 74, the portion 10c has a corresponding recess housing the coating element 68.

According to a variant not shown, the support element 50 lacks the coating element 68.

According to a further variant not shown, the coating element 68 completely covers the arm 65.

From the foregoing, the advantages of the above described seat 3 are evident. When the body 18 is in the raised configuration, the support element 50, in the operating configuration, ensures the safety of the child in the event of accidents with side impacts against the sides of the vehicle, as it blocks the movement of the child towards the centre of the passenger compartment.

On the other hand, when the body 18 is in the lowered configuration and defines a place for an adult passenger, the support element 50 is brought into the rest configuration, in which it is invisible and therefore does not alter the aesthetic value and comfort of the seat 3. In fact, the passenger can move freely on the seat 3.

Since the end part of the support element 50 is housed in the recess 74, in the rest position, it is possible to construct this end portion with a wider thickness than that of the portion 66.

Furthermore, as already mentioned, the gripping portion 71 helps the passenger to comfortably handle the support element 50, while the coating element 68 provides a more comfortable support for the child.

Finally, it is evident to those skilled in the art how modifications and variations can be made to the seat 3, without thereby departing from the protective scope defined by the appended claims.

For example, the body 18 could carry another support element 50 on the side defined by the surface 35.

Furthermore, the seat 3 could be a rear seat of the split type, and/or could be a front seat, and/or could define one or two places, instead of three.

Finally, the cavity 17 could be formed at the centre of the seat portion 10; and/or the raised configuration of the body 18 could be provided above the fixed element 12, optionally without any support foot 44, instead of being provided above the empty cavity 17.

The invention claimed is:

1. A seat of a motor vehicle comprising:
   a backrest;
   a seat portion comprising a fixed element and at least one movable element which comprises a body having an upper surface and a pair of side surfaces opposite to each other; said body being displaceable between:
   a) a lowered configuration, in which said upper surface forms, with an upper face of said fixed element and with said backrest, a place for an adult passenger;
   b) a raised configuration, in which said body is arranged higher than when it is arranged in the lowered configuration and forms a booster seat suitable for supporting a child; and
   fastening means for releasably fastening said body at least in the raised configuration;
   said movable element further comprising at least one side support element, which comprises a shoulder portion and is displaceable with respect to said body between:
   an operating configuration, in which said support element is arranged next to said body and said shoulder portion projects upwards with respect to said upper surface, at least when said body is in the raised configuration, to limit, in use, any side displacement of a child seated on said booster seat; and
   a rest configuration, in which said support element is arranged lower or flush with respect to said upper surface, at least when said body is in the lowered configuration;
   wherein:
   said support element comprises an arm having a first and a second end portion opposite to each other;
   said support element is arranged alongside one of said side surfaces when said support element is in the rest configuration;
   said movable element further comprises a coupling device, which couples said second end portion to said body in a rotatable manner about a hinge axis;
   said first end portion defines said shoulder portion; and
   said arm is rigid to bending.

2. The seat according to claim 1, wherein said hinge axis is horizontal and transversal to said pair of side surfaces.

3. The seat according to claim 1, wherein one of said body and said fixed element defines a housing, which houses at least one part of the shoulder portion when said support element is in the rest configuration.

4. The seat according to claim 3, wherein said shoulder portion comprises a surface, which is arranged flush with said upper surface when said at least one part of the shoulder portion is housed in said housing.

5. The seat according to claim 1, wherein said shoulder portion comprises a core and a coating element, made of a material softer than the one of said core.

6. The seat according to claim 1, wherein said shoulder portion has a concave surface defining a recess.

7. The seat according to claim 6, wherein said concave surface is U-shaped or V-shaped and faces downwards when said support element is in the rest configuration.

8. The seat according to claim 1, wherein said coupling device is defined by a hinge.

9. The seat according to claim 8, wherein said hinge comprises a pin having:
   a first coupling end, arranged in an angularly fixed position with respect to said support element; and
   a second coupling end, opposite said first coupling end along said hinge axis, engaging a hinge seat formed in said body and rotating around said hinge axis.

10. The seat according to claim 9, wherein said hinge further comprises a rib which protrudes radially and in a fixed position from said pin, and a pair of limit shoulders, fixed with respect to said body, angularly spaced apart about said hinge axis and suitable for cooperating in abutment with said rib to limit the angular stroke of said support element in said rest and operating configurations.

11. The seat according to claim 1, comprising two side support elements respectively arranged next to a first and to a second side of said body, at least when both side support elements are arranged in the operating configuration; said first and second sides being opposite each other with respect to an axis parallel to said hinge axis.

12. The seat according to claim 1, wherein said fastening means comprise first and second fixed anchoring elements and third attachment elements coupled to said body; said first anchoring elements being arranged higher than said second anchoring elements, and said third attachment elements being releasably connected to said first and second anchoring elements for fixing, respectively, said body in said raised configuration and in said lowered configuration.

13. The seat according to claim 1, wherein said fixed element defines at least one cavity, which is engaged by said movable element when said body is arranged in said lowered configuration.

* * * * *